United States Patent Office 2,940,946
Patented June 14, 1960

2,940,946
ALLYL ALCOHOL-VINYL AROMATIC COPOLYMERS

Edward C. Shokal, Walnut Creek, and Paul A. Devlin, Orinda, Calif., assignors to Shell Oil Company, a corporation of Delaware No Drawing. Filed July 22, 1957, Ser. No. 673,147

13 Claims. (Cl. 260—23)

This invention relates to novel copolymers of allyl alcohol and vinyl aromatics. More particularly this invention realtes to novel copolymers of allyl alcohol and vinyl aromatics such as styrene and substituted styrenes which copolymers are characterized by, among other things, clarity of color and improved stability.

Over the years there has been prepared and marketed a number of synthetic surface coating compositions which will produce hard films with short drying times in air. Such compositions are resinous in nature and have been prepared from a variety of compounds. Among such compounds are the synthetic unsaturated fatty acid esters which may be prepared from polyhydric alcohols and unsaturated fatty acids. As it happens, the methods for preparing such compositions usually require that the various ingredients be reacted at rather high temperatures for long periods of time. One result of such treatment is that some gelling may occur so that the product is characterized by poor stability. Further, prolonged heat treatment often causes the product to darken to a deep amber or brown, which color is reflected in the ultimate product. Such color characteristics together with poor stability often cause the ultimate product to darken further on aging. In our patent, U.S. 2,630,430, we described and claimed novel copolymers of allyl alcohol and styrene which are suitable for preparing synthetic unsaturated fatty acid esters. Those copolymers may be reacted to produce fast drying oil acid esters which give hard surface coatings. They are prepared by bubbling air, or oxygen, through a reaction mixture of allyl alcohol and styrene. Those copolymers have the disadvantages described above, i.e. they are characterized by a dark color and some gelling on heating so that when they are used in the preparation of synthetic esters dark amber products are produced which have limited stability.

It is an object of this invention to provide novel copolymers of allyl alcohol and vinyl aromatics which are characterized by clarity of color and improved heat stability. It is another object of this invention to provide novel copolymers which are practically colorless and which remain practically colorless on prolonged heating at high temperatures. It is yet another object of this invention to provide novel synthetic fatty acid esters of high clarity and stability, which esters are used in surface coating compositions. It is still another object of this invention to provide novel processes for the preparation of the novel copolymers of this invention. Other objects will become apparent as the description proceeds.

These and other objects are accomplished by a substantially colorless copolymer of allyl alcohol and a vinyl aromatic compound containing from about 15% to about 85%, by weight, of combined vinyl aromatic, the copolymer being prepared by heating a mixture of the alcohol and the vinyl aromatic at temperatures ranging from about 100° C. to about 250° C. in the presence of from about .1% to about 25% of a peroxide having a decomposition temperature in excess of 90° C., the quantity of the peroxide being based on the weight of the copolymer produced, the said mixture of allyl alcohol and the vinyl aromatic compound being maintained in a mole ratio from about 10:1 to about 900:1 by the incremental addition of vinyl aromatic compound as the polymerization progresses, the copolymer being further characterized as being stable after heating for four hours at 250° C.

The copolymers of this invention are prepared by the programed addition of the vinyl aromatic compound as the reaction proceeds. Such a method of preparation is most simple and permits uniform quality. Bulk polymerizations without programed addition of the vinyl aromatic requires the adoption of extreme production control measures in order to obtain a uniformly high quality product. Such extremes are not feasible for mass production techniques. The additions are such so to maintain an excess of the allyl alcohol as the reaction proceeds. In the most preferred embodiment, the ratio of unreacted monomers are maintained about constant as such a procedure affords the most preferred products. This is because the monomers have different polymerization rates and if a substantially constant ratio is not maintained as the polymerization progresses a product is obtained which has a great variety of structural characteristics which affects the quality of the copolymer in surface coating applications. It will be appreciated, however, that considerable latitude in the maintenance of ratios is permitted before quality is effected. Such latitude may range from 10 to 50 moles at lower ratios and as high as 200 moles at higher ratios.

The extent to which the unreacted mixtures of monomers may be present during the reaction may be varied within wide limits depending on the usefulness of the final product and, to some extent, on certain economic considerations. It may be stated that a copolymer which contains in excess of about 85% by weight of the vinyl aromatic compound has too few —OH groups to be useful for the preparation of the surface coating compositions which are described more fully hereinafter. Such a copolymer approaches a product which is substantially all polymerized vinyl aromatic compound. On the other hand, desirable copolymers are those which contain a sufficient number of —OH units, derived from the allyl alcohol, through which esterification may later take place. Such a product is represented, for example, by a copolymer containing one allyl alcohol unit per unit of the vinyl aromatic compound. As the proportion of hydroxyl groups increases a copolymer is obtained which will ultimately produce a highly esterified product which is extremely well suited for the production of clear surface coatings of improved stability to heat and solvents. In order to obtain a copolymer having a higher proportion of hydroxyl groups the reaction mixture must contain a smaller proportion of vinyl aromatic compound thereby permitting a greater proportion of the allyl alcohol to copolymerize. When such is the case, a greater quantity of the peroxide is required in order to effect the desired copolymerization subject to certain temperature considerations which are explained more fully hereinafter. As the quantity of the peroxide increases the present cost of preparing the copolymers of this invention increases sharply and is a limiting factor in the commercialization of the copolymers of this invention.

From the foregoing it appears that the weight percent of vinyl aromatic units in the copolymer is governed primarily by the ratio of unreacted monomers subject to polymerization and the quantity of peroxide employed. These relationships are tabulated as follows for representative illustration when the temperature is about 120° C. at autogenic pressure and the peroxide is di-tert-butyl peroxide.

| Allyl Alcohol-Vinyl Aromatic Ratio, Moles Unreacted Monomers in Polymerization Mixture | Peroxide, percent w. of Copolymer | Vinyl Aromatic, percent w. in Copolymer |
| --- | --- | --- |
| 10:1 | 3.5 | 82 |
| 20:1 | 7.2 | 69 |
| 30:1 | 9.9 | 60 |
| 900:1 | 23.7 | 13 |

It will be appreciated that these figures are subject to the ordinary considerations involved in mass production techniques. Thus, for a 10:1 mole ratio no substantial difference is observed if the peroxide amounts to 3%, by weight of the copolymer, in which case slightly more of the vinyl aromatic compound may be polymerized, e.g. in the order of 85% by weight.

The vinyl aromatic compounds which may be employed for the preparation of the novel copolymers of this invention are those which are characterized by a vinyl group, i.e. $-CH=CH_2$, being attached directly to an aromatic nucleus. The aromatic nucleus may be substituted or unsubstituted as desired so long as the unsaturation of the vinyl group is not hindered as in alpha-methyl styrene. Among the substituents which may appear on the aromatic nucleus there may be mentioned lower alkyls such as methyl and ethyl, halogen as chlorine, and the like. The nature of the aromatic nucleus is unimportant since it does not affect the reaction between the monomers. Representative vinyl aromatic compounds include p-methyl styrene, ortho-methyl styrene, meta-methyl styrene, 2,4-dimethyl styrene, p-chlorostyrene, para-ethyl styrene, beta-vinyl naphthalene and the like. The preferred species of vinyl aromatic is styrene as that vinyl aromatic is abundant, inexpensive and yields copolymers most simply employed for the preparation of synthetic drying oil esters.

Any peroxide which is stable at temperatures above about 90° C. may be utilized. Such peroxides include di-tertiary-butyl peroxide, hydrogen peroxide, tertiary-butyl hydroperoxide, cumene hydroperoxide, paramethane hydroperoxide, tertiary-butyl perbenzoate and the like. At temperatures substantially below about 95° C., irrespective of the peroxide used, the allyl alcohol does not react with the vinyl aromatic either at a feasible rate, or at all. The particular peroxide which is selected for use will mainly be a question of economics and efficiency. Thus, for example, hydrogen peroxide is perfectly satisfactory except that it requires longer reaction times and it gives low conversions. These disadvantages of hydrogen peroxide may be offset in some measure by intermittently adding more hydrogen peroxide as the reaction proceeds. Benzoyl peroxide may also be employed but is not preferred as it is rather costly. On the other hand, peroxides such as diacetyl peroxide should be avoided because of their explosive nature when in a pure state. Such peroxides, however, may be used in dilution with organic solvents. This has the additional disadvantage that higher processing cost results due to separation and recovery of the solvent. It will hereinafter appear that the processes for producing the copolymers require that temperatures in excess of about 100° C. be used. Accordingly, in the preferred embodiment the peroxide should be stable at about 100° C. or any other temperature which is selected as the operating temperature. Such a procedure is simple, economic and safe. Irrespective of the particular peroxide which is used, it is important to be certain that a sufficient quantity of the peroxide is present as the polymerization proceeds.

The quantity of the peroxide which is used will vary depending on a number of considerations. One important consideration is the proportion of the allyl alcohol present as the polymerization proceeds i.e. with higher concentrations of the alcohol greater amounts of peroxide are required. This in turn is related to the nature of the copolymer. As previously indicated, the quantity of the vinyl aromatic present in the copolymer should not exceed about 85% by weight as the copolymer then becomes unsuited for the preparation of high quality drying oil esters for surface coating applications. On the other hand, the quantity of vinyl aromatic should not be too low because the amount of the peroxide required then becomes so large as to make the product too costly. Another equally important consideration in determining the quantity of peroxide to be employed is the temperature at which the copolymerization is conducted. As a generalization, it may be stated that at higher temperatures, i.e., in the order of 160–180° C., the quantity of the peroxide required is lower; at lower temperatures, i.e., in the order of 120–130° C., the quantity of the peroxide required is greater. This relationship in turn depends to some extent upon the stability of the peroxide at the higher temperatures. At the higher temperatures the copolymerization is somewhat hastened by the effect of heat so that lesser quantities of peroxide are required. Further, at the higher temperatures the half life of the peroxide is markedly reduced so that the employment of large amounts of peroxide serves no useful purpose. Finally, the preparation of the present copolymers at higher temperatures very substantially increases the polymerization rate so that the time for the copolymerization to be completed may be quite short, i.e., in the order of about 30 minutes.

At temperatures substantially below 120° C., i.e. in the order of 95° C. or lower, the conversion of the allyl alcohol may be low so that the copolymer may not have a sufficient number of $-OH$ groups as indicated by measurement of hydroxyl values. In other cases copolymerization will not take place. The most efficient method of operation also requires that the reaction be conducted in a closed system in order to prevent the allyl alcohol from vaporizing into the atmosphere. Accordingly, it is preferred that the system be under pressure as the reaction proceeds. The pressure generated by the system at the operating temperature is a very convenient pressure to use. However, if desired, higher or lower pressures may be used but no operational advantage is gained by such modifications. Actually, such modifications operate as a disadvantage as higher processing costs may be incurred. Therefore, operating pressures will be seen to be a matter of choice which in no way affects the scope of the invention. At temperatures of about 120° C. autogenic pressures will be about 30 to 50 p.s.i. depending on the amount of allyl alcohol present. At higher temperatures the pressure may reach about 150 p.s.i. but the pressure may be higher depending on the quantity of allyl alcohol present.

The temperature, in addition to being a factor which influences the reaction time and quantity of peroxide, also determines to a large extent the molecular weight of the product. At higher temperatures, the molecular weight will be lowered. Thus, depending on the desired use of the copolymer, the temperature of the reaction may be adjusted accordingly. As the copolymers of this invention are primarily desired for the production of synthetic drying oil fatty esters, as will hereinafter appear more fully, a preferred molecular weight of about 700 to 3000 is obtained at a temperature of 120° C. to 180° C. However, the molecular weight may range from about 300 to about 4000 depending, in part, on the operating temperatures and other variables. In any case the temperature should not exceed 250° C.

From the foregoing, it will be observed that the copolymers of this invention depend on several variables all of which are so inter-related as to make the processes for preparing the copolymers particularly capable of wide variations. These variables are summarized in paragraphs 1 through 6 together with the most important effect of variations of these factors.

(1) The ratio of unreacted monomers in the polymerization vessel determines the number of hydroxyl groups in the final copolymer. If the number of hydroxyl groups in the copolymer is too low, i.e. less than that amount present when the copolymer contains about 15% by weight of allyl alcohol, synthetic fatty esters are obtained which are not suitable for surface coating applications.

(2) The quantity of peroxide required to produce the copolymers in general is fairly large at the lower temperatures. In addition the quantity required will vary with the nature of the peroxide and the proportion of allyl alcohol in the reaction mixture so that with increased allyl alcohol concentration the required quantity of peroxide increases. The requirement for large amounts of peroxide at the preferred ratios and temperature range may be largely offset by operating at higher temperatures.

(3) The temperature will largely affect the rate of copolymerization, the molecular weight of the copolymer and to a lesser extent the quantity of the peroxide required. If the temperature is too low the allyl alcohol may not copolymerize.

(4) The molecular weight of the copolymer will largely depend on the allyl alcohol concentration and on the operating temperatures. In general, very high molecular weights, i.e. in excess of about 4,000, are not suitable because a high vinyl aromatic content is required in order to obtain such molecular weights.

(5) The stability of the peroxide at the copolymerization temperature will be reflected largely in the time required for the reaction to be completed. When the peroxide has poorer stability at lower temperatures larger quantities of peroxide are required. A representative peroxide in this category is hydrogen peroxide. When the peroxide has greater stability considerably lesser amounts are required particularly at higher temperatures. In this regard, it should be noted that a fast reaction rate is not too desirable because the control of the other reaction variables, such as molar ratios of the reactants, becomes increasingly more difficult.

(6) The programed addition of reactants is required in order to maintain a suitable ratio of reactants so as to yield a copolymer having sufficient hydroxyl groups. This requires essentially that the vinyl aromatic compound be added incrementally as the reaction proceeds. However, under certain circumstances it is advantageous to also program in additional peroxide and allyl alcohol.

In view of these considerations it will be helpful to a better understanding of the examples which follow to indicate generally the most preferred conditions involving the above variables. Thus, a copolymer having a suitable number of hydroxyl groups and molecular weight is obtained when a vinyl aromatic, as styrene, is programed to a mixture of allyl alcohol-vinyl aromatic so as to maintain a mole ratio of 20:1 to about 30:1 of unreacted monomers. With di-tert-butyl peroxide being employed in an amount of about 7 to about 10% by weight of of the copolymer formed, at temperatures from 120–140° C. there is obtained a product of about 60 to about 70% by weight of the vinyl aromatic. It will be understood that these amounts and conditions are intended to serve as a useful guide and they are not intended as being definitive of the invention.

The reaction vessel may be of conventional design whereby the reactants may be fed into the vessel as the reaction proceeds. This is of considerable importance since the ratios of the unreacted monomers within the vessel should be held approximately within prescribed limits as the reaction proceeds. The reaction vessel may be any of the standard pressure vessels fitted with appropriate fixtures whereby the vinyl aromatic compound may be fed into the vessel as it is consumed. At this point care should be taken to insure that the vinyl aromatic will not commence autopolymerization prior to entering the reaction vessel. This may be accomplished by feeding cooled vinyl aromatic into the reactor or by cooling the conduits leading to the vessel through which the vinyl aromatic enters the reaction vessel. Alternatively, the vinyl aromatic may be incrementally added in dilution with allyl alcohol. In view of the numerous variables which are involved, operation in a continuous fashion affords closer production and quality control. Continuous operation also affords the usual advantage of such production techniques.

After the copolymerization is complete, the reaction product is worked up in order to recover the copolymer and remove unreacted monomer and byproducts which sometimes form. The separation may be accomplished by any suitable means, as for example by distillation. Unreacted allyl alcohol may be recovered at 100 mm. Hg. After the alcohol is recovered a small amount of unreacted vinyl aromatic is recovered together with light polymer by merely lowering the pressure. The residue, which is the product, is run out of the reaction vessel while it is hot and fluid. It may be drawn into pans or onto a belt conveyor for cooling. The copolymer thus stabilized and cooled is a clear, hard, solid which is soluble in common organic solvents as lower alcohols, acetone, chloroform, benzene, toluene and the like. It is insoluble in water, mineral acids and other polar liquids. The extent to which the copolymer is soluble in the solvents will vary depending on the relative proportions of allyl alcohol and vinyl aromatic in the copolymer. Thus, for example, when the copolymer has a high allyl alcohol content it will be more readily soluble in lower alcohols. On the other hand, when the allyl alcohol content is lower, the copolymer will be more readily soluble in benzene, toluene, and the like. The copolymers are further characterized by remarkable heat and color stability on prolonged heating at elevated temperatures in air or in inert atmospheres. These advantages, i.e. color purity and heat stability will be recognized by paint chemists and others skilled in the art as a substantial improvement over our copolymer prepared by the use of air or oxygen as described in our patent, U.S. 2,630,430, which copolymers do not exhibit such characteristics.

While we do not limit the scope of this invention by theoretical considerations, it is believed that the copolymers of the present invention have such remarkable color and heat stability because of the substantial absence of unsaturation in the product as indicated by iodine values. This lack of unsaturation is believed to be due to the specific catalytic action of the peroxides, which function as hydrogen abstractors as well as chain initiators but not as an oxidant which would form carbonyl and other color unstable groups.

As previously indicated, two major advantages of the novel copolymers of this invention are that they are practically colorless and are highly stable on heating for long periods of time. These features permit their utilization in the production of synthetic fatty acid esters for surface coatings which have greatly improved color and stability. In addition, the surface coatings will be characterized by other desirable properties such as hardness, flexibility, impact strength and water and solvent resistance. Such drying fatty acid esters are prepared by esterifying the copolymer with fatty acids which may be saturated or unsaturated. The esterification is effected, for example, by reacting approximately equivalent amounts of the copolymer and a fatty acid at temperatures from about 170° C. to about 250° C. The reaction is desirably conducted in an atmosphere of an inert gas, as nitrogen. As water forms from the esterification, it is removed from the reaction mass by distillation. In considering equivalent amounts of the fatty acid and the copolymer, stoichiometric proportions are intended, i.e., such that there is for each carboxylic group of the acid one hydroxyl group from the above copolymer. Thus, for example, where the copolymer has a hydroxyl value of 0.55 eq./100 g. and is to be reacted with an unsaturated fatty acid derived from linseed oil having an acid number of about 199 (equivalent weight=281), about 155 parts by weight of the acid is required for each 100 parts of the copolymer. The use of excess acid ordinarily is avoided as the final product usually is less satisfactory. In some instances, it may be desirable to have an excess of the copolymer in the order of 10% to 20% unreacted hydroxyl groups. The esterification is conducted in conventional types of of apparatus fitted with an agitator, distillation column, inlet and outlet for the inert gas, and a thermometer. The esterification is substantially complete when the acid number of the reaction mixture is about 30 or less.

The unsaturated fatty acids may be selected from those of 12 to 30 carbon atoms having an iodine number of 85 or higher. Suitable fatty acids having one ethylenic double bond include, for example, oleic acid, lauroleic acid, palmitoleic acid, linoleic acid, linolenic acid, and the like. It is preferred, however, that the unsaturated fatty acids have more than one olefinic double bond. Such fatty acids include the drying oil fatty acids obtained as a mixture of individual acids by hydrolysis of natural drying oils such as linseed oil, soybean oil, dehydrated castor oil, perilla oil, and the like. Also, the unsaturated fatty acids obtained by treating drying oils so as to effect conjugation of the double bonds, as by alkaline isomerization, are suitable for preparation of the synthetic drying esters of this invention.

The synthetic drying oils may be modified by effecting the esterification in a mixture of an unsaturated fatty acid and a polycarboxylic acid or an anhydride as maleic anhydride, phthalic anhydride, fumaric acid, sebacic acid, succinic acid, and the like. When such a mixture is used the total carboxyl of the polycarboxylic acid and the unsaturated acid should not exceed the hydroxyl equivalent of the copolymer. Ordinarily, about 10% by weight of the polycarboxylic acid in such a mixture of acids is used. The vinyl aromatic-allyl alcohol copolymers of this invention may be described as polyhydric alcohols and accordingly other polyhydric alcohols may optionally be admixed with the copolymer in forming the ester. Such polyhydric alcohols include glycerine, ethylene glycol, diethylene glycol, pentaerythritol, and the like.

The preparation of the novel allyl alcohol-vinyl aromatic copolymers and their utilization in the preparation of unsaturated fatty acid esters are described in greater detail in the following examples which are intended solely for purposes of illustration.

*Example I*

To a pressure vessel equipped with an agitator, thermometer, and suitable fixtures for pumping liquids into the vessel under pressure, are charged 11,085 grams (191 moles) of allyl alcohol, 994 grams (9.6 moles) of styrene stabilized with .005% of tertiary-butyl catechol, and 241.6 grams of ditertiary-butyl peroxide. The temperature is raised to 135° C. and maintained at about this temperature for 5 hours. Over the 5 hour period additional styrene is pumped into the reaction vessel so that at the end of the first hour about an additional 700 grams of styrene is added; at the end of the second hour about 490 grams; at the end of the third hour about 344 grams; at the end of the fourth hour about 242 grams; and at the end of the fifth hour about 169 grams. This styrene likewise contains tertiary-butyl catechol stabilizer. After the reaction is complete, the contents of the vessel are distilled to separate the unreacted monomers. The residue, at 23% conversion, is a brittle resin which is substantially colorless. It has a hydroxyl equivalent of .45/100 g., a molecular weight of about 1300, a softening point (Durrans) of 95° C. and an acidity of less than 0.001 eq./100 g. A sample of the copolymer in a test tube is heated in an inert atmosphere of nitrogen for four hours at 250° C. after which the copolymer is still substantially colorless although a slight yellowish tint develops. When heated in air for four hours at 250° C. the copolymer acquires a pale yellow color but in neither case does gelling occur. For the purpose of comparison, samples of the copolymer produced by the procedure of Example I of U.S. Patent 2,630,430 are identically heated for 4 hours at 250° C. first in air then in an atmosphere of nitrogen. In both cases the copolymer gells and acquires a dark brown color with considerable charring indicated when the comparative test is conducted in air.

*Example II*

The procedure of Example I is repeated except that the following quantities are initially charged into the reaction vessel: 11,382 grams of allyl alcohol, 878 grams of styrene and 214 grams of ditertiary-butyl peroxide. The reaction vessel is pressured with nitrogen to 60 p.s.i.g. An additional 1877 grams of styrene are continuously fed into the reaction vessel over a 5 hour period at the following rates: during the first hour 618 grams, during the second hour 465 grams; during the third hour 341 grams, during the fourth hour 259 grams; during the fifth hour 194 grams. At the end of each hour, samples are withdrawn from the vessel for analysis and in that way the amount of styrene needed to maintain a 20:1 ratio of allyl alcohol to styrene is determined. The final product at 22% conversion, is brittle, clear, and has a color of about one on the Gardner scale. It has a hydroxyl equivalent of 0.43 eq./100 g. and a molecular weight of about 1240. A sample is heated for four hours at 125° C. The sample thus treated did not gell and it remained substantially colorless although a slight yellow tint is preceptable.

*Example III*

The procedure of Example II is repeated except that a molar equivalent of tertiary-butyl hydroperoxide, is used instead of the ditertiary-butyl peroxide. A product having analogous physical properties to that of Example II is obtained.

*Example IV*

To a reaction vessel equipped as in Example I are charged 9800 grams (168.8 moles) of allyl alcohol and 597 grams (5.74 moles) of styrene stabilized with tertiary-butyl catechol. The contents of the vessel are raised to about 180° C. and pressured to about 145 p.s.ig. with nitrogen. About 375 grams of styrene is pumped into the reaction vessel during the first hour. Through another inlet simultaneously therewith a solution of 42.4 grams of ditertiary-butyl peroxide in 200 grams of allyl alcohol are also added. The copolymer is then separated using the same procedure of Example I. It has a slight yellowish tint and analogous properties as the product of Example II.

*Example V*

To a reaction vessel equipped as in Example I are charged 9800 grams of allyl alcohol, 352 grams of styrene stabilized with tertiary-butyl catechol and 203 grams of ditertiary-butyl peroxide. The reaction is conducted at about 135° C. and 50 p.s.i.g. About 712 grams of styrene are added over a four hour period in amounts averaging about 250 grams per hour. The final product is similar to that of the other examples and has a hydroxyl equivalent of 0.57 eq./100 g.

*Example VI*

To a pressure vessel suitably equipped with an agitator, thermometer, heating and cooling means and an inlet for adding liquids to the vessel is charged a mixture of 23.3 moles of allyl alcohol, 1.15 moles of styrene and .67% by weight of hydrogen peroxide as a 30% aqueous solution. The temperature is raised to, and maintained at, 135° C. during the entire run which lasts for 5 hours. When the temperature reaches 135° C., after about 15 minutes, styrene is continuously fed in so that 511 grams are added over a period of 4.5 hours. Five samples are withdrawn at hour intervals and analysis shows that the peroxide content falls off sharply after 1.5 hours so that after 4.5 hours only .05%, by weight, of peroxide is present. The copolymer is worked up by removal of unreacted allyl alcohol, styrene and water. The product contains 50.6%, by weight, of allyl alcohol and 2.8%, by weight, of styrene. There is obtained a 33.8% conversion to polymer having a hydroxyl value of .095 and a molecular weight of about 900. The copolymer has a slight yellow color which is stable after heating for four hours at 250° C. although some darkening occurs.

*Example VII*

The procedure of Example VI is repeated except that the reaction takes place at 125° C. and the quantity of the peroxide is initially increased to about 1% by weight. Substantially the same results are obtained except that the conversion to copolymer is about 25.6%.

*Example VIII*

To a reaction vessel equipped as in Example VI are charged 270 grams of allyl alcohol, 549 grams of para-methylstyrene and 8.2 grams of ditertiary-butyl peroxide. The temperature is raised to 185° C. and maintained at about this temperature for several hours while the mixture is blanketed with nitrogen. During the first, third and fifth hours, respectively, 8.2 grams of ditertiary-butyl peroxide is added. When the reaction is complete the contents of the vessel are distilled at 155° C. at about 1 mm. Hg. The copolymer is a clear, substantially colorless brittle resin having a mlecular weight of about 470, a hydroxyl value of about 0.36 eq./100 g., and an acidity of less than 0.001 eq./100 g.

*Example IX*

The procedure of Example VIII is repeated except that a molar equivalent of cumene hydroperoxide is used instead of the ditertiary-butyl peroxide. A similar product to that of Example VIII is produced.

*Example X*

A para-chlorostyrene-allyl alcohol copolymer is prepared using the same weight relationship and procedure of Example VIII. The product is a clear, substantially colorless solid.

As previously indicated the copolymers of the type described above are used in the preparation of synthetic fatty acids. Examples XI through XV illustrate typical procedures of preparation of unsaturated fatty esters.

*Example XI*

To a reaction vessel equipped with an agitator, reflux condenser, thermometer, heating and cooling means, an inlet and outlet for circulating an inert gas, are charged 224 grams of the resin prepared by the procedure of Example I, 115 grams of dehydrated castor acid and 100 grams of xylene. The temperature is raised to about 230° C. over a period of one hour while an atmosphere of nitrogen is formed in the reaction vessel. The temperature is maintained at 230° C. for a period of about 3 hours. Most of the xylene is recirculated through the reaction vessel as it refluxes. The reaction is complete when the desired acid number is obtained as determined from samples which are removed periodically from the reaction vessel. At the end of three hours the product has an acid number of 6.5. The product is diluted with mineral spirits to a viscosity of E-F on the Gardner-Holdt scale and has a color of one on the Gardner scale. The product thus prepared may be used as an air dried surface coating with a dryer such as cobalt naphthenate in an amount of about 0.05%. If desired a similar coating may be prepared using magnesium naphthenate and drying it at elevated temperatures in the order of 200° C.

For the purposes of comparison a sample of the copolymer produced by the procedure of Example I of U.S. Patent 2,630,430 is used in preparing a similar polyester. The procedure is the same as that described in this example. The final product has a very dark-amber color.

*Example XII*

To a reaction vessel equipped as in Example XI are charged 149 grams of the copolymer prepared by the procedure of Example I, 162 grams of soya fatty acids and 87 grams of xylene. The reaction time is about 11 hours. The final product is diluted with mineral spirits to a Gardner-Holdt viscosity of E-F; it has a solids content of 66.3% and a color of 5 on the Gardner scale. For the purposes of comparison a sample of the copolymer produced by the procedure of Example I of U.S. Patent 2,630,430 is used in preparing a similar polyester. The procedure is the same as that described in this example. The final product has a very dark-amber color.

*Example XIII*

The procedure of Example XI is repeated except that .4 equivalents of dehydrated castor acid is used for each equivalent of the para-methylstyrene-allyl alcohol copolymer prepared by the procedure of Example VIII. The product after reacting at 250° C. for several hours is diluted with mineral spirits to a Gardner-Holdt viscosity of E-F. When mixed with a small amount of cobalt naphthenate it forms a film in air which for all practical purposes is colorless.

*Example XIV*

The procedures of Example XI are repeated except that a parachlorostyrene-allyl alcohol copolymer, prepared by the procedure of Example I, is used. The final product has only a slight yellowish tint and forms suitable films in air on the addition of 0.05% by weight of cobalt naphthenate.

The esters described in the above examples are prepared from unsaturated fatty acids but the fatty esters may likewise be prepared from saturated fatty acids. Such acids are of the type represented by coconut acids or they may be obtained by hydrogenating unsaturated fatty acids of the type described above. The products thus obtained are useful for blending with other resins as the aminoplasts, such as urea-formaldehyde and melamine-formaldehyde resins, and used for baked enamel finishings. The finishings thus formed are found to have improved color characteristics, which are resistant to aging. The following example illustrates a typical procedure for preparing saturated fatty esters of this invention.

*Example XV*

To a reaction vessel equipped with an agitator, thermometer, condenser, heating and cooling jacket, and appropriate inlets and outlets, are charged 300 grams of the copolymer prepared by the procedure of Example I, 124 grams of coconut fatty acids and 100 grams of xylene. With constant agitation, the temperature of the reaction mixture is raised to 250° C. over a 60 minute period. Nitrogen is circulated through the vessel as the reaction proceeds. An acid number of 3.5 is obtained after a 3 hour period after which the mixture is cooled. The xylene functions to remove the water of esterification as it forms. The product on dilution to 70% solids with xylene, is filtered and has a color of about 3 and a viscosity of U-V on the Gardner-Holdt scale.

From the foregoing description of the copolymers and the fatty esters prepared therefrom, it will be seen that the invention is capable of substantial variation not only to specific ingredients but also to conditions of reactions. Such variations will be readily understood by those skilled in the art. Thus, for example, it will be understood that the acid numbers of the synthetic drying fatty esters may be varied over a rather wide range. Most preferred are those that are in the order of 5 through 8. In other cases an acid number of 10 is acceptable particularly where excessively long reaction times are required to make the acid number lower. In other instances, an acid number of 20 to 40 may be required for rather specialized uses.

This application is a continuation-in-part of application Serial No. 607,602, filed September 4, 1956, now abandoned.

We claim as our invention:

1. A copolymer of allyl alcohol and a mono-vinyl aromatic selected from the group consisting of styrene, paramethyl styrene, ortho-methyl styrene, meta-methyl styrene, 2,4-dimethyl styrene, para-chlorostyrene, para-ethyl styrene and beta-vinyl naphthylene, said copolymer containing from about 15% to about 85%, by weight, of combined vinyl aromatic, the copolymer having a molecular weight ranging from about 300 to about 4000, being essentially free of carbonyl values, having a color ranging from essentially colorless to a light yellow and being free of gel after heating for four hours at 250° C., the copolymer being further characterized as being insoluble in water and mineral acid and being soluble in a solvent selected from the group consisting of methanol, acetone, chloroform, benzene and toluene.

2. A copolymer of allyl alcohol and styrene containing from about 15% to about 85% by weight, of combined styrene, the copolymer having a molecular weight ranging from about 300 to about 4000, being essentially free of carbonyl values, having a color ranging from essentially colorless to a light yellow and being free of gel after heating for four hours at 250° C., the copolymer being further characterized as being insoluble in water and mineral acid and being soluble in a solvent selected from the group consisting of methanol, acetone, chloroform, benzene and toluene.

3. A copolymer of allyl alcohol and p-methyl styrene containing from about 15% to about 85%, by weight, of combined p-methyl styrene, the copolymer having a molecular weight ranging from about 300 to about 4000, being essentially free of carbonyl values, having a color ranging from essentially colorless to a light yellow and being free of gel after heating for four hours at 250° C., the copolymer being further characterized as being insoluble in water and mineral acid and being soluble in a solvent selected from the group consisting of methanol, acetone, chloroform, benzene and toluene.

4. A copolymer of allyl alcohol and p-chlorostyrene containing from about 15% to about 85%, by weight, of combined p-chlorostyrene, the copolymer having a molecular weight ranging form about 300 to about 4000, being essentially free of carbonyl values, having a color ranging from essentially colorless to a light yellow and being free of gel after heating for four hours at 250° C., the copolymer being further characterized as being insoluble in water and mineral acid and being soluble in a solvent selected from the group consisting of methanol, acetone, chloroform, benzene and toluene.

5. A process for preparing a copolymer of allyl alcohol and a mono-vinyl aromatic compound selected from the group consting of styrene, para-methyl styrene, ortho-methyl styrene, meta-methyl styrene, 2,4-dimethyl styrene, para-chlorostyrene, para-ethyl styrene and beta-vinyl naphthylene comprising reacting the alcohol and the vinyl aromatic at temperatures ranging from about 100° C. to about 250° C. in the presence of from about 0.1% to about 25% of a peroxide decomposing at temperatures in excess of 90° C. and within the above temperature range, the peroxide being selected from the group consisting of hydrogen peroxide and organic peroxides, the quantity of peroxide being based on the weight of the copolymer produced, the said mixture of allyl alcohol and vinyl aromatic compound being maintained essentially constant in the mole ratio from about 10:1 to about 900:1 by the incremental addition of vinyl aromatic compound as the polymerization progresses.

6. A process for preparing a copolymer of allyl alcohol and styrene comprising reacting the alcohol and styrene at temperatures ranging from about 100° C. to about 250° C. in the presence of from about 0.1% to about 25% of a peroxide decomposing at temperatures in excess of 90° C. and within the above temperature range, the peroxide being selected from the group consisting of hydrogen peroxide and organic peroxides, the quantity of peroxide being based on the weight of the copolymer produced, the said mixture of allyl alcohol and styrene being maintained essentially constant in a mole ratio from about 10:1 to about 900:1 by the incremental addition of styrene as the polymerization progresses.

7. A process for preparing a copolymer of allyl alcohol and p-methyl styrene comprising reacting the alcohol and styrene at temperatures ranging from about 100° C. to about 250° C. in the presence of from about 0.1% to about 25% of a peroxide decomposing at temperatures in excess of 90° C. and within the above temperature range, the peroxide being selected from the group consisting of hydrogen peroxide and organic peroxides, the quantity of peroxide being based on the weight of the copolymer produced, the said mixture of allyl alcohol and p-methyl styrene being maintained essentially constant in a mole ratio from about 10:1 to about 900:1 by the incremental addition of p-methyl styrene as the polymerization progresses.

8. A process for preparing a copolymer of allyl alcohol and p-chlorostyrene comprising reacting the alcohol and styrene at temperatures ranging from about 100° C. to about 250° C. in the presence of from about 0.1% to about 25% of a peroxide decomposing at temperatures in excess of 90° C. and within the above temperature range, the peroxide being selected from the group consisting of hydrogen peroxide and organic peroxides, the quantity of peroxide being based on the weight of the copolymer produced, the said mixture of allyl alcohol and p-chlorostyrene being maintained essentially constant in a mole ratio from about 10:1 to about 900:1 by the incremental addition of p-chlorostyrene as the polymerization progresses.

9. The process of claim 5 in which the peroxide is di-tert-butyl peroxide.

10. The process of claim 5 in which the peroxide is tert-butyl hydroperoxide.

11. A synthetic drying fatty ester having an acid number less than 20 which comprises the reaction product of a fatty acid of 12 to 20 carbon atoms and an allyl alcohol-mono-vinyl aromatic copolymer, the mono-vinyl aromatic being selected from the group consisting of styrene, para-methyl styrene, ortho-methyl styrene, meta-methyl styrene, 2,4-dimethyl styrene, para-chlorostyrene, para-ethyl styrene and beta-vinyl naphthylene, the copolymer containing from about 15% to about 85% by weight, of combined vinyl aromatic, the copolymer having a molecular weight ranging from about 300 to about 4000, being essentially free of carbonyl values, having a color ranging from essentially colorless to a light yellow and being free of gel after heating for four hours at 250° C., the copolymer being further characterized as being insoluble in water and mineral acid and being soluble in a solvent selected from the group consisting of methanol, acetone, chloroform, benzene and toluene.

12. A synthetic drying fatty ester having an acid number less than 10 which comprises the reaction product of a fatty acid of 12 to 20 carbon atoms and an allyl alcohol-styrene copolymer, the copolymer containing from about 15% to about 85%, by weight, of combined styrene, the copolymer having a molecular weight ranging from about 300 to about 4000, being essentially free of carbonyl values, having a color ranging from essentially colorless to a light yellow and being free of gel after heating for four four hours at 250° C., the copolymer being further characterized as being insoluble in water and mineral acid and being soluble in a solvent selected from the group consisting of methanol, acetone, chloroform, benzene and toluene.

13. A synthetic drying fatty acid as in claim 11 in which the peroxide is di-tert-butyl peroxide.

References Cited in the file of this patent

UNITED STATES PATENTS

| | | |
|---|---|---|
| 2,521,754 | Shusman | Sept. 12, 1950 |
| 2,588,890 | Shokal et al. | Mar. 11, 1952 |
| 2,630,430 | Shokal et al. | Mar. 3, 1953 |
| 2,656,334 | D'Alelio | Oct. 20, 1953 |
| 2,855,388 | Chapin et al. | Oct. 7, 1958 |
| 2,894,938 | Chapin et al. | July 14, 1959 |